US009432097B2

(12) United States Patent
Sezginer et al.

(10) Patent No.: US 9,432,097 B2
(45) Date of Patent: Aug. 30, 2016

(54) ENHANCED MODULATION

(71) Applicant: Sequans Communications S.A., Colombes (FR)

(72) Inventors: Serdar Sezginer, Colombes (FR); Hikmet Sari, Colombes (FR)

(73) Assignee: Sequans Communications S.A., Colombes (FR)

( * ) Notice: Subject to any disclaimer, the term of this patent is extended or adjusted under 35 U.S.C. 154(b) by 0 days.

(21) Appl. No.: 14/670,975

(22) Filed: Mar. 27, 2015

(65) Prior Publication Data
US 2015/0349858 A1 Dec. 3, 2015

(30) Foreign Application Priority Data

Mar. 27, 2014 (EP) ..................................... 14305444

(51) Int. Cl.
- *H04B 7/02* (2006.01)
- *H04B 7/04* (2006.01)
- *H04L 5/00* (2006.01)
- *H04L 1/00* (2006.01)
- *H04L 1/06* (2006.01)

(52) U.S. Cl.
CPC ........... *H04B 7/0413* (2013.01); *H04L 1/0001* (2013.01); *H04L 1/06* (2013.01); *H04L 5/0053* (2013.01)

(58) Field of Classification Search
CPC . H04L 1/0058; H04L 1/0637; H04L 1/0631; H04B 7/0851
USPC ........ 375/260, 267, 271, 295, 299; 455/101, 455/102, 500
See application file for complete search history.

(56) References Cited

U.S. PATENT DOCUMENTS

| | | | | |
|---|---|---|---|---|
| 8,081,697 | B2 * | 12/2011 | Choi | H04B 7/0851 375/260 |
| 2005/0135498 | A1 * | 6/2005 | Yee | H04L 1/0631 375/267 |
| 2005/0147180 | A1 * | 7/2005 | Ionescu | H04L 1/0637 375/295 |
| 2006/0171481 | A1 * | 8/2006 | Ionescu | H04L 1/0058 375/267 |

OTHER PUBLICATIONS

European Search Report in European Patent Application No. EP 14305444.3; Date of Mailing: Jul. 10, 2014.
Elkalagy, A., et al., "A Novel Two-Antenna Spatial Modulation Technique with Simultaneous Transmission," *Software, Telecommunications & Computer Networks, 2009. Softcom 2009. 17th International Conference on, IEEE*; pp. 230-234 (Sep. 24, 2009).
Ping Yang, et al., "Adaptive Spatial Modulation for Wireless MIMO Transmission Systems," *IEEE Communications Letters*; 15(6):602-604 (Jun. 1, 2011).
Di Renzo, et al., "Spatial Modulation for Generalized MIMO: Challenges, Opportunities, and Implementation," *Proceedings of IEEE*, 102(1): 56-103 (Jan. 1, 2014).

* cited by examiner

*Primary Examiner* — Khanh C Tran
(74) *Attorney, Agent, or Firm* — Hamilton, Brook, Smith & Reynolds, P.C.

(57) ABSTRACT

A method of transmitting data comprising choosing a transmit modulation scheme of the transmission, choosing a transmit parameter of the transmission, transmitting the data stream according to the chosen transmit modulation and transmit parameter such that data of the data stream is transmitted by the modulation scheme and the choice of transmit parameter.

12 Claims, 3 Drawing Sheets

ENHANCED MODULATION

RELATED APPLICATION

This application claims priority under 35 U.S.C. §119 or 365 to European Application No. 14305444.3, filed Mar. 27, 2014. The entire teachings of the above application are incorporated herein by reference.

TECHNICAL FIELD

The present disclosure relates to enhanced modulation of a data stream to be transmitted. It is particularly suitable for, but by no means limited to the transmission of serial data symbols utilizing both a plurality of modulation schemes as well as a further changeable transmission parameter such as the selection of the active antenna, carrier scheme, frequency slot and/or time slot of transmission.

BACKGROUND

Multiple antenna techniques, also known as MIMO (multiple-input multiple-output) are commonly used in wireless communications systems. A general block diagram of a MIMO system is illustrated in FIG. 1. The system may comprise a transmitter 10 and corresponding receiver 11. The transmitter and receiver may also comprise multiple transmit and receive antennae as shown.

Multiple antennae at the transmitter and receiver can be used for different purposes which may include increasing the data throughput, improving performance over fading channels, or both. One of the most common MIMO techniques is the so-called spatial multiplexing (SMX), which comprises transmitting parallel independent data streams from the different transmit antennae. Compared to a single-input single-output (SISO) system, an SMX system with two transmit antennae doubles the system throughput, and similarly, it quadruples the system throughput when four transmit antennae are present as would be understood.

Recently, a class of MIMO systems, referred to as Spatial Modulation (SM), has been introduced with the purpose of reducing the number of RF chains in the transmitter and thus reducing the overall transmission system complexity.

FIG. 2A illustrates the concept of SM (where two antennae may be driven by the same transmitter or by different transmitters). Consider a pair of symbols (s1, s2) of an incoming serial data stream 20. As shown in FIG. 2A, spatial multiplexing transmits symbol s1 from the first antenna 23 (referred to as hereinafter as Tx1) and symbol s2 from the second antenna 24 (referred to hereinafter as Tx2). In spatial modulation, illustrated in FIG. 2B, only one of the two transmit antennae is active at any one time, and the active antenna is determined by an information bit 21. In the example of FIG. 2B (where one transmitter drives both antennae in turn), Tx1 is active when information bit 21 is 0, and Tx2 is active when the information bit is 1. To simplify the description of SM, suppose that the modulation is binary phase-shift keying (BPSK), in which each symbol carries a single bit as would be understood. Symbol s2 is used to select the antenna from which symbol s1 will be transmitted. As shown in FIG. 2B, symbol s1 is transmitted from Tx1 when s2=0. To summarize, SM transmits two bits per channel use (bpcu) with BPSK (1 bit transmitted by the modulation and one bit determined by the antenna that was used to transmit), three bpcu with quaternary phase shift keying (QPSK), five bpcu with 16-state quadrature amplitude modulation (16-QAM), and more generally, m+1 bpcu with a modulation, which has $M=2^m$ constellation points. In comparison, SMX (FIG. 2A) has 2m bpcu capacity, because it can transmit two symbols in parallel.

Both the systems of FIGS. 2A and 2B may comprise a processor with associated support components, some being RF support components for providing the antenna drive signals and for manipulating the incoming data stream into transmittable symbols as would be understood.

For SM with four transmit antennae, the number of transmitted bits per channel use becomes m+2, because two bits are assigned to the selection of one active antenna among four. There are also other variants of SM in which more than one antenna transmits simultaneously. For example, if there are four transmit antennae and two of them are active (they transmit simultaneously), SM transmits 2m+2 bpcu, because two bits are assigned to select the active antennae and two symbols (of m bits each) are transmitted from the selected two antennae.

With the same number of antennae, SMX transmits 4m bpcu. Therefore the reduced number of RF chains in the transmitter and the reduced complexity of SM come at the expense of reducing the data throughput compared to known SMX systems.

As a further example, consider a conventional SM system with two transmit antennae and using QPSK modulation. This system is illustrated in Table I below, which shows the two combinations, denoted C1 and C2.

TABLE I

| Conventional SM with 2Tx | | |
|---|---|---|
|  | Tx1 | Tx2 |
| C1 | QPSK | 0 |
| C2 | 0 | QPSK |

Combination C1 comprises activating the first antenna (Tx1) and transmitting a QPSK symbol from that antenna. Similarly, combination C2 comprises activating the second antenna (Tx2) and transmitting a QPSK symbol from that antenna. As can be seen, the total number of combinations is two, therefore one bit is sufficient to select a particular combination. As is known, two bits determine a particular QPSK symbol to be transmitted from the selected antenna. Therefore, this conventional scheme transmits three bpcu.

There is, therefore, a need to increase the data throughput whilst maintaining the use of a less complex system as with conventional SM.

SUMMARY

According to a first aspect there is provided a method of transmitting data as defined in claim 1 of the appended claims.

Thus there is provided a method comprising:
selecting a plurality of transmit modulation schemes for the data transmission, selecting a plurality of antennae for the data transmission, determining combinations of the selected transmit modulation schemes and the selected antennae for communicating the data to a receiver, wherein a first set of the combinations comprise a first modulation scheme and a second set of the combinations comprise a second different modulation scheme, and when transmitting, combinations are selected based on bits of the data to be transmitted.

Optionally, the transmit modulation schemes comprise a plurality of signal constellations.

Optionally, the plurality of signal constellations comprise interpolated constellations.

Optionally, the plurality of signal constellations comprise a primary constellation and at least one secondary constellation.

Optionally, each secondary constellation is derived from the primary constellation by geometric rotation and/or partitioning.

Optionally, the signal constellations are chosen to preserve a minimum Euclidean distance between transmitted signal values.

Optionally, the data stream is transmitted at a fixed data rate.

Optionally, at least one of the modulation schemes comprises a logical union of a plurality of signal constellations.

Optionally, wherein selecting each antenna is determined by a symbol of the data to be transmitted.

Optionally, wherein selecting each antenna is determined by a group of bits of the data to be transmitted.

Optionally, wherein selecting each antenna is determined by a plurality of bits of the data to be transmitted.

Optionally, wherein selecting each antenna is determined by a plurality of bits of the data to be transmitted.

Optionally, selection of said combinations of antennae and modulation schemes is made using bits of the data to be transmitted.

Optionally, selection of said combinations of antennae and modulation schemes is made using information bits to be transmitted.

Optionally, the data is communicated to a receiver by both the data transmitted and the antennae selected.

Optionally, the data is communicated to a receiver by both the combination of the antennae and constellations selected and the symbols transmitted from those antennae.

Optionally, the data is communicated to a receiver by both the combination of the antennae and modulation scheme selected and the symbols transmitted from those antennae.

Optionally, a third set of the combinations comprise at least two active antennae at any one time.

Optionally, the at least two active antennae concurrently transmit using at least two different modulation schemes.

Optionally, the method further comprises transmitting symbols of the data according to the determined combination of selected transmit modulation schemes and selected antennae.

Optionally, the first set and the second set are the same.

Optionally, the second set and the third set are the same.

According to a second aspect there is provided a system as defined in claim 10.

Optionally, the system further comprises a receiver arranged to receive the stream and to determine the data transmitted.

According to a third aspect there is provided a computer readable medium as defined in claim 12.

With all the aspects, preferable and optional features are defined in the dependent claims.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments. Embodiments will now be described, by way of example only, and with reference to the drawings in which.

In the figures, like elements are indicated by like reference numerals throughout.

OVERVIEW

The present disclosure describes a number of techniques that may be used in order to provide enhanced spatial modulation which include:

1) Increasing the number of bits associated with the selection of active antennae combinations for transmission.
2) Using multiple signal constellations (conventional MIMO systems use a single signal constellation).
3) Deriving a secondary signal constellation through spatial interpolation between the points of a primary signal constellation and to use the secondary constellation according to design rules that preserve minimum Euclidean distance between transmitted signal values. The secondary signal constellation may be used to allow more information to be transmitted and is selected to provide a number of constellation points corresponding to the bit information required to be transmitted.

Figure 4:
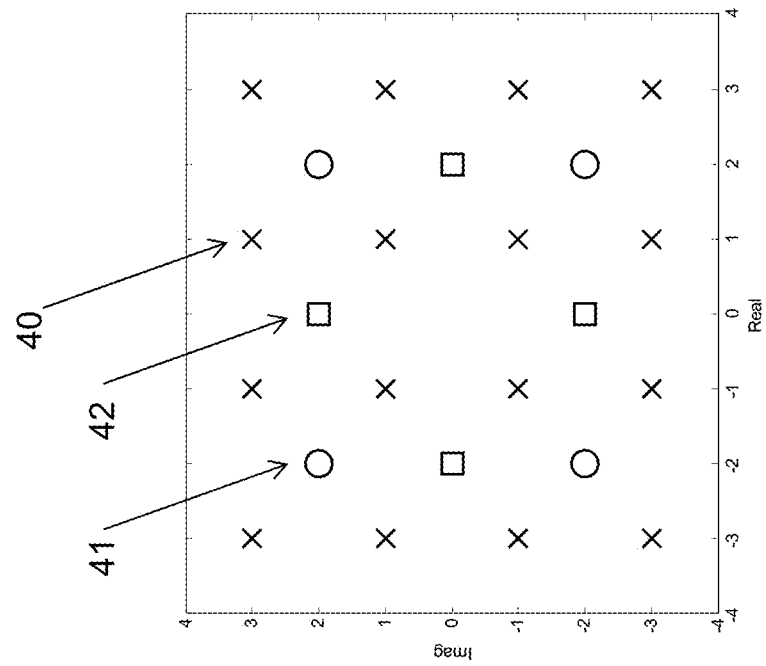
FIG. 4 illustrates signal constellations used in Enhanced SM with QAM as primary modulation according to an embodiment.
Figure 3:
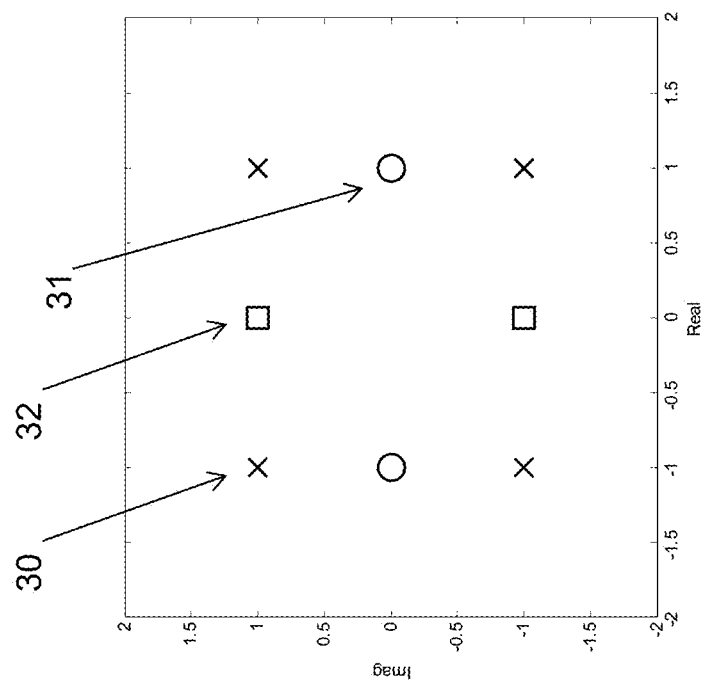
FIG. 3 illustrates signal constellations used in Enhanced SM with QPSK as primary modulation according to an embodiment.
Figure 5:
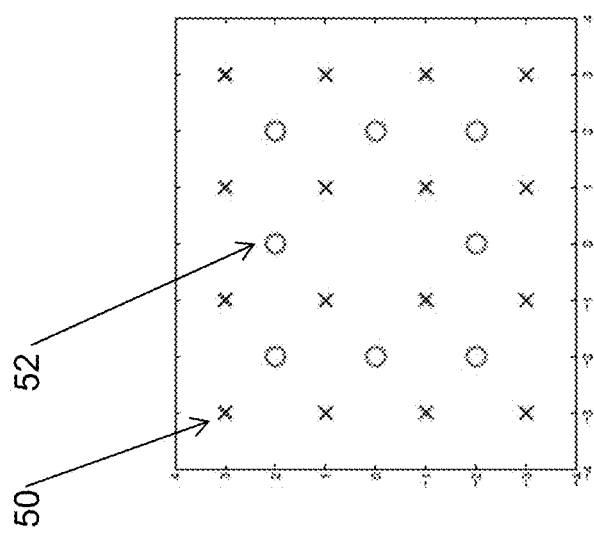
FIG. 5 illustrates signal constellations used in Enhanced SM with 16QAM and 8QAM according to embodiment.

It is noted that the term 'value' refers to a geometric representation in a plane. FIGS. 3 to 5 illustrate geometric points comprising amplitude and phase information. The 'value' defines the amplitude and the phase of the point in question.

These techniques all contribute to providing enhanced spatial modulation.

DETAILED DESCRIPTION

Transmission

In the following description, the hardware is considered to be based on the system of FIG. 2B with additional antennae (Tx3, Tx4 for example) as described.

Enhanced SM with 2 Antennae

Figure 1:
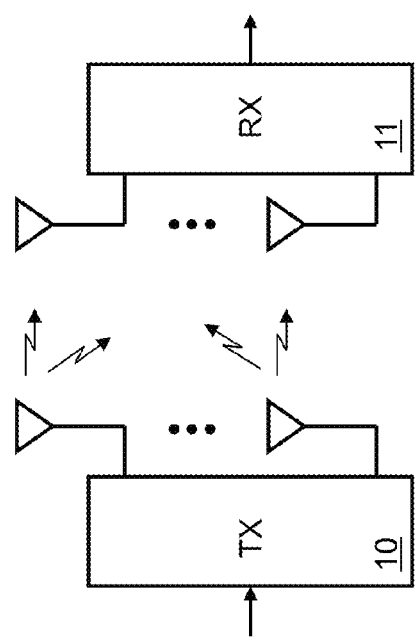
FIG. 1 illustrates a known MIMO system.
Figure 2A:
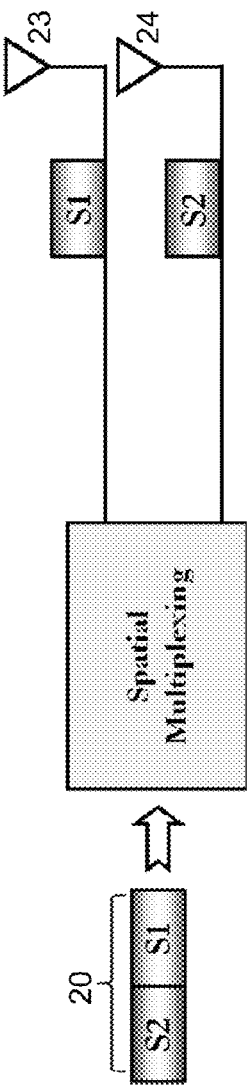
FIG. 2A illustrates spatial multiplexing at a transmitter.
Figure 2B:
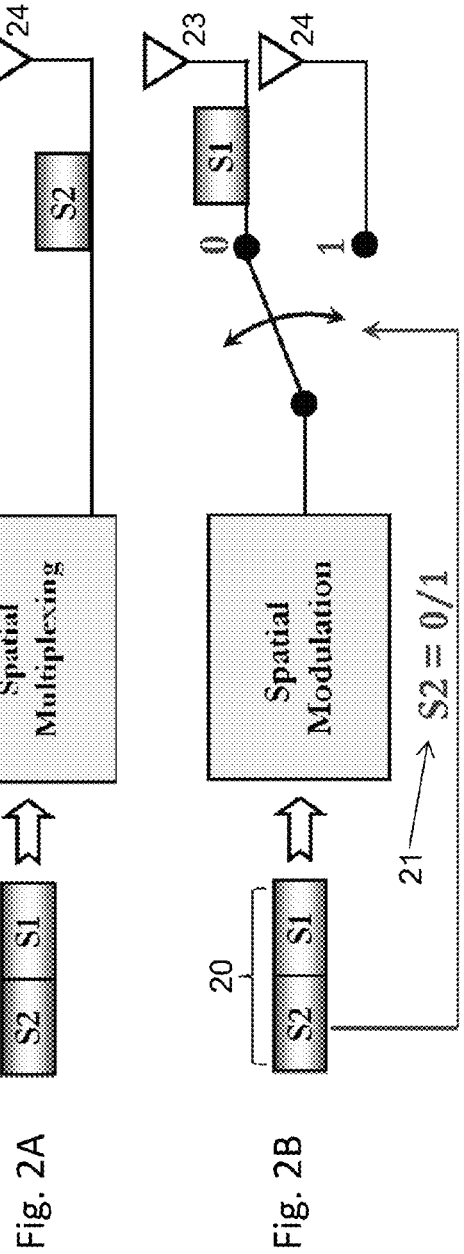
FIG. 2B illustrates spatial modulation at a transmitter.

In a system comprising two antennae as in FIG. 2B, four combinations may be used as shown in Table II. The first two combinations (which may be considered a first set) in this table (C1, C2) are those of Table I. That is, only one antenna is active which transmits a QPSK symbol. However, this embodiment comprises two additional combinations (C3, C4) which may be considered a second set, corresponding to simultaneous transmissions from the two antennae. The modulations used in these two combinations (BPSK0 and BPSK1) are different from the QPSK used in C1 and C2 and different from one another.

TABLE II

Enhanced SM with 2Tx

| | Tx1 | Tx2 |
|---|---|---|
| C1 | QPSK | 0 |
| C2 | 0 | QPSK |
| C3 | BPSK0 | BPSK0 |
| C4 | BPSK1 | BPSK1 |

With the above scheme, the bpcu is the same in all combinations. Two bits are transmitted from the selected antenna using a QPSK symbol in combinations C1 and C2 whereas in combinations C3 and C4, each antenna transmits one symbol using a BPSK modulation. In combinations C3 and C4, both antennas transmit symbols from the same BPSK modulation, and the BPSK0 and BPSK1 modulations respectively used in C3 and C4 preferably have a maximum geometric separation (Euclidean distance—as shown in FIG. 3) to maximize detection capability and bit error rate performance as would be understood by the skilled person. Other signal constellations could be used with reduced geometric separation as would be understood.

FIG. 3 shows signal constellations (as would be understood) used in Enhanced SM with QPSK as primary modulation as per Table II. The crosses 30 represent QPSK, the circles 31 represent the BPSK0 modulation and the squares 32 represent BPSK1 modulation. Constellations are interpolated as can be seen in order to provide more information from the two antennae.

The total transmit power is the same in all combinations. Referring to FIG. 3, the minimum distance between the points of the QPSK constellation (30) is 2 and that the power of the QPSK symbols is also 2 (the sum of the real part squared plus the imaginary part squared). The BPSK0 (31) and BPSK1 (32) signal constellations are selected such that the distance between BPSK0 points is 2 and the distance between BPSK1 points is also 2 as in QPSK. The power of their symbols is 1 as would be understood. Since two BPSK symbols are transmitted simultaneously in combinations C3 and C4, the transmitted signal power of combinations C3 and C4 is also 2 as in combinations C1 and C2.

With four combinations, this scheme transmits four bpcu (two bits transmitted per combination and two bits to determine the combination used for transmission), compared to the three bpcu data throughput of conventional SM as shown in table I (that only uses two combinations).

Enhanced SM with 4 Antennae

In a further embodiment, four transmit antennae may be used. With such an arrangement, the enhanced SM technique may use the 16 combinations given in Table III. As well as the combinations as shown (where C5 to C10 comprise BPSK0 and C11 to C16 comprise BPSK1), in another embodiment, C5 to C10 may comprise combinations having (BPSK0, BPSK1 on the two active antennae) and C11 to C16 may comprise combinations having (BPSK1, BPSK0) on the two active antennae. With four antennae, conventional SM uses only the first four combinations from table III. The conventional combinations correspond to the transmission of a QPSK symbol from one of the four antennae (C1 to C4). Combinations C5 to C10 correspond to the transmission of two BPSK0 symbols in parallel from two of the four available antennae. Similarly, combinations C11 to C16 correspond to the transmission of two BPSK1 symbols in parallel from two antennae. The number of combinations is sixteen, therefore four information bits are assigned to select one of them, and the total bpcu is six (two per combination plus the four information bits). In contrast, conventional SM is only able to transmit four bpcu from combination C1 to C4 (two per combination plus two information bits). C1 to C4 may be considered to be one set of combinations. C5 to C10 may be considered to be another set of combinations, and C11 to C16 may be considered to be further set of combinations. In table III each set comprises a different modulation scheme.

TABLE III

Enhanced SM with 4Tx

| | Tx1 | Tx2 | Tx3 | Tx4 |
|---|---|---|---|---|
| C1 | QPSK | 0 | 0 | 0 |
| C2 | 0 | QPSK | 0 | 0 |
| C3 | 0 | 0 | QPSK | 0 |
| C4 | 0 | 0 | 0 | QPSK |
| C5 | BPSK0 | BPSK0 | 0 | 0 |
| C6 | BPSK0 | 0 | BPSK0 | 0 |
| C7 | BPSK0 | 0 | 0 | BPSK0 |
| C8 | 0 | BPSK0 | BPSK0 | 0 |
| C9 | 0 | BPSK0 | | BPSK0 |
| C10 | 0 | 0 | BPSK0 | BPSK0 |
| C11 | BPSK1 | BPSK1 | 0 | 0 |
| C12 | BPSK1 | 0 | BPSK1 | 0 |
| C13 | BPSK1 | 0 | 0 | BPSK1 |
| C14 | 0 | BPSK1 | BPSK1 | 0 |
| C15 | 0 | BPSK1 | 0 | BPSK1 |
| C16 | 0 | 0 | BPSK1 | BPSK1 |

QAM Modulation

In a further embodiment, QAM signal constellations may be used. In the following, the use of 16-QAM signal constellation is described, but higher-level signal constellations may also be used for example 32QAM and 64QAM, the latter of which is used in the WiFi, WiMax, and LTE standards. The multiple signal constellations used in Enhanced SM of this embodiment are shown in FIG. 4 (16-QAM as primary modulation 40). The interpolated signal constellation points of QPSK0 (41) and QPSK1 (42) are located at the centers of the grid, which represents 16-QAM. The signal constellations of FIG. 4 may be formed by phase rotation and amplitude scaling as is clear from the figure. In other embodiments, other constellations may also be used and formed from phase rotation and amplitude scaling. Using these signal constellations, combinations are formed as in QPSK. Firstly, turning to a two antenna embodiment, QPSK of Table II is replaced by 16-QAM, BPSK0 by QPSK0, and BPSK1 by QPSK1 as shown in Table IV.

TABLE IV

Enhanced SM with QAM and 2Tx

| | Tx1 | Tx2 |
|---|---|---|
| C1 | 16QAM | 0 |
| C2 | 0 | 16QAM |
| C3 | QPSK0 | QPSK0 |
| C4 | QPSK1 | QPSK1 |

The resulting scheme transmits 6 bpcu, because two bits are needed to determine a particular combination, and four bits are needed to assign symbols to the active antenna(s). The corresponding conventional SM scheme only transmits 5 bpcu because it only assigns one bit to active antenna selection.

In the Four-Tx embodiment, the antenna and constellation combinations are those of Table III, where, again, QPSK is replaced by 16-QAM, BPSK0 by QPSK0, and BPSK1 by QPSK1 (see Table V).

TABLE V

Enhanced SM with QAM and 4Tx

|  | Tx1 | Tx2 | Tx3 | Tx4 |
|---|---|---|---|---|
| C1 | 16QAM | 0 | 0 | 0 |
| C2 | 0 | 16QAM | 0 | 0 |
| C3 | 0 | 0 | 16QAM | 0 |
| C4 | 0 | 0 | 0 | 16QAM |
| C5 | QPSK0 | QPSK0 | 0 | 0 |
| C6 | QPSK0 | 0 | QPSK0 | 0 |
| C7 | QPSK0 | 0 | 0 | QPSK0 |
| C8 | 0 | QPSK0 | QPSK0 | 0 |
| C9 | 0 | QPSK0 | 0 | QPSK0 |
| C10 | 0 | 0 | QPSK0 | QPSK0 |
| C11 | QPSK1 | QPSK1 | 0 | 0 |
| C12 | QPSK1 | 0 | QPSK1 | 0 |
| C13 | QPSK1 | 0 | 0 | QPSK1 |
| C14 | 0 | QPSK1 | QPSK1 | 0 |
| C15 | 0 | QPSK1 | 0 | QPSK1 |
| C16 | 0 | 0 | QPSK1 | QPSK1 |

With 16 combinations, four bits are needed to determine a particular combination, and four bits are needed to determine a 16-QAM symbol or two QPSK symbols to transmit from the selected antenna(s). Therefore, this Enhanced SM scheme transmits eight bpcu, while conventional SM only transmits six bpcu (four per combination plus two information bits) from combinations C1 to C4. As well as the combinations as shown (where C5 to C10 comprise QPSK0 and C11 to C16 comprise QPSK1), in another embodiment, C5 to C10 may comprise combinations having (QPSK0, QPSK1 on the two active antennae) and C11 to C16 may comprise combinations having (QPSK1, QPSK0) on the two active antennae.

Conventional SM with 16-QAM and four transmit antennae, two of which are active utilizes four antenna combinations as shown in Table VI below. Here, we have two active antennae at any one time compared to the one active antenna case considered in the previous examples and embodiments.

TABLE VI

Conventional SM with 16QAM and 4Tx

|  | Tx1 | Tx2 | Tx3 | Tx4 |
|---|---|---|---|---|
| C1 | 16QAM | 16QAM | 0 | 0 |
| C2 | 0 | 0 | 16QAM | 16QAM |
| C3 | 16QAM | 0 | 0 | 16QAM |
| C4 | 0 | 16QAM | 16QAM | 0 |

With two antennae transmitting 16-QAM symbols in parallel and four active antenna combinations used, the scheme transmits ten bpcu (eight per combination plus two information bits). In an embodiment of enhanced SM transmitting the same bpcu and based on 16-QAM as primary modulation, the eight combinations shown in Table VII can be used. C1 to C4 may be considered to be a set of combinations and C5 to C8 may be considered to be another set of combinations. In table VII each set comprises two different modulation schemes. FIG. 5 illustrates the corresponding constellation plot where 16-QAM is defined by the crosses 50 and 8-QAM is defined by the circles 52.

TABLE VII

Enhanced SM with 16QAM, 8QAM and 4Tx

|  | Tx1 | Tx2 | Tx3 | Tx4 |
|---|---|---|---|---|
| C1 | 16QAM | 8QAM | 0 | 0 |
| C2 | 0 | 0 | 16QAM | 8QAM |
| C3 | 16QAM | 0 | 0 | 8QAM |
| C4 | 0 | 16QAM | 8QAM | 0 |
| C5 | 8QAM | 16QAM | 0 | 0 |
| C6 | 0 | 0 | 8QAM | 16QAM |
| C7 | 8QAM | 0 | 0 | 16QAM |
| C8 | 0 | 8QAM | 16QAM | 0 |

The 8-QAM modulation used in this scheme comprises the logic union of the QPSK0 and QPSK1 modulations used in the previous embodiments (see for example values 41 (QPSK0) and 42 (QPSK1) of FIG. 4 that appear as one group in the constellation of FIG. 5). Each antenna/modulation combination comprises one antenna transmitting a 16-QAM symbol (four bits) and one antenna transmitting an 8-QAM symbol (three bits) hence comprising seven bits in total, and the eight antennae combinations are selected using three information bits (ten bpcu in total). Compared to the conventional SM scheme transmitting the same number of bits per channel use, this scheme has the advantage of reducing the total transmitted power as the average power symbol is smaller than conventional QAM. This is because the power of the 8QAM values is less than 16 QAM which reduces the average power.

The embodiments as described herein in relation to transmission are just a few of the combinations of active antennae and modulation schemes possible. The same concept may be extended to other numbers of transmit antennae, to other primary signal constellations, and to other secondary signal constellations, as well as to different combinations thereof.

With the above schemes, multiple signal constellations may be used in such a way that all antenna and modulation combinations transmit the same date rate, and the resulting multiple antenna system transmits a fixed bit rate. This is because for any one combination of antennae and modulation, the data rate is fixed as the bpcu is constant. This has the advantage of negating the requirement for buffering as all parts of the transmit/receive system have the same data rate and may therefore process data at the same speed without needing to store either processed or unprocessed data in a queue owing to different data rates present in different parts of the system.

Furthermore, the number of antenna and modulation combinations of the enhanced spatial modulation is higher than the number of antenna combinations in conventional spatial modulation systems (as shown in tables I and C1 to C4 table III, IV) Owing to the larger number of combinations, a higher number of information bits are assigned to selection of a particular combination. This contributes to an improved spatial modulation system where more information may be transmitted by the same underlying transmission/reception hardware as known systems.

The enhanced SM embodiments disclosed herein provide an increased data rate for a given transmission power, or for a given data rate less transmission power is used.

Reception

Figure 6:
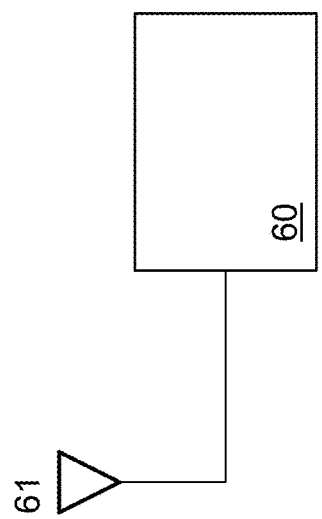
FIG. 6 illustrates a receiver.

For both conventional SM and enhanced SM as described herein, the optimum detector comprises a maximum likelihood (ML) detector which minimizes the Euclidean distance between the received signal and receiver decisions. The receiver 60 may comprise one or more antennae 61 (see FIG. 6) and a processor with associated support components, some being RF support components as would be understood.

For the Conventional SM scheme with two Tx antennas and QPSK modulation represented in Table I, the ML detector operates as follows:

Assume that $h_1$ denotes the channel response between TX1 and the receiver, $h_2$ denotes the channel response between TX2 and the receiver, and r denotes the received signal sample on which the determination will be based. Based on minimizing the following function (comparing to the receiver's prior knowledge of an ideal signal channel response with no noise), the receiver determines which QPSK symbol value $a^{(i)}$, i=1, 2, 3, 4 was transmitted:

$$\text{Min}\{|r-h_1 a^{(i)}|^2, |r-h_2 a^{(i)}|^2\}$$

The receiver also determines which active antenna was used to transmit the symbol:

If $|r-h_1 a^{(i)}|^2 < |r-h_2 a^{(j)}|^2$ for the decided QPSK symbol $a^{(i)}$, then the receiver determines that the symbol was transmitted from TX1, otherwise the receiver determines that the symbol was transmitted from TX2.

After determining the symbol and the transmit path, all of the information bits transmitted can be decoded at the receiver.

In the case of Enhanced SM, the ML receiver operates in a similar fashion. Referring back to Table II, which shows the 4 combinations corresponding to two TX antennae and QPSK as primary modulation, the receiver makes its decisions by comparing the following metrics:

$$\{|r-h_1 a^{(i)}|^2, |r-h_2 a^{(j)}|^2, |r-h_1 s_0^{(k)} - h_2 s_0^{(l)}|, |r-h_1 s_1^{(k)} - h_2 s_1^{(l)}|^2\}$$

where, as previously, $a^{(i)}$, i=1, 2, 3, 4 represent the four symbol values of the QPSK signal constellation, and $s_0(k)$, k=1, 2 and $s_0(l)$, l=1, 2 represent the two symbol values of the BPSK0 signal constellation and $s_1(k)$, k=1, 2 and $s_1(l)$, l=1, 2 represent the two symbol values of the BPSK1 signal constellation.

The decision on the two bits used for selecting one of the 4 possible combinations C1-C4 is made based on the sum which minimizes the expression above. Similar arrangements are applied to the other antenna/modulation combinations described herein.

The techniques described herein increases the number of transmitted bpcu. Conventional SM requires a higher level modulation to achieve the same spectral efficiency (same bpcu). When Conventional SM and Enhanced SM are used at the same spectral efficiency, the ML detector complexities with enhanced SM are no more than conventional SM.

The various methods described above may be implemented by a computer program. The computer program may include computer code arranged to instruct a computer, processor and/or system to perform the functions of one or more of the various methods described above. The computer program and/or the code for performing such methods may be provided to an apparatus and/or system, such as a computer or processor, on a computer readable medium and/or a computer program product. The computer readable medium could be, for example, an electronic, magnetic, optical, electromagnetic, infrared, or semiconductor system, or a propagation medium for data transmission, for example for downloading the code over the Internet. The computer readable medium could take the form of a physical computer readable medium such as semiconductor or solid state memory, magnetic tape, punch card, a removable computer diskette, a random access memory (RAM), a read-only memory (ROM), a rigid magnetic disc, and an optical disk, such as a CD-ROM, CD-R/W, DVD or Blu-ray. The computer readable medium may comprise non-transitory media as well as transmission media.

An apparatus such as a computer may be configured in accordance with such code to perform one or more processes in accordance with the various methods discussed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method of transmitting data comprising:
   selecting a plurality of transmit modulation schemes for the data transmission;
   selecting a plurality of antennae for the data transmission;
   determining combinations of the selected transmit modulation schemes and the selected antennae for communicating the data to a receiver; wherein
   a first set of the combinations comprise a first modulation scheme and a second set of the combinations comprise a second different modulation scheme; and
   when transmitting, combinations are selected based on bits of the data to be transmitted;
   wherein the transmit modulation schemes comprise a plurality of signal constellations and wherein the plurality of signal constellations comprise interpolated constellations.

2. The method of claim 1 wherein the signal constellations are chosen to preserve a minimum Euclidean distance between transmitted signal values.

3. The method of claim 1 wherein selecting each antenna is determined by a plurality of bits of the data to be transmitted.

4. The method of claim 1 wherein the data is communicated to the receiver by both the combination of the antennae and modulation scheme constellations selected and the symbols transmitted from those antennae.

5. The method of claim 1 wherein a third set of the combinations comprise at least two active antennae at any one time.

6. The method of claim 5 wherein the at least two active antennae concurrently transmit using at least two different modulation schemes.

7. The method of claim 5 wherein the second set and the third set are the same.

8. The method of claim 1 wherein the first set and the second set are the same.

9. The method of claim 1 further comprising transmitting symbols of the data according to the determined combination of selected transmit modulation schemes and selected antennae.

10. A system comprising at least one transmitter arranged to transmit a data stream according to the method of claim 1.

11. The system of claim 10 further comprising a receiver arranged to receive the stream and to determine the data transmitted.

12. A non-transitory computer readable medium comprising instructions that when executed by a processor cause the processor to carry out the method of claim 1.

* * * * *